Feb. 18, 1958 W. L. RAUCHER 2,823,626
CONTROL CIRCUITS FOR ELECTRIC INCINERATORS
Filed March 10, 1955 2 Sheets-Sheet 1
*Fig. 1*
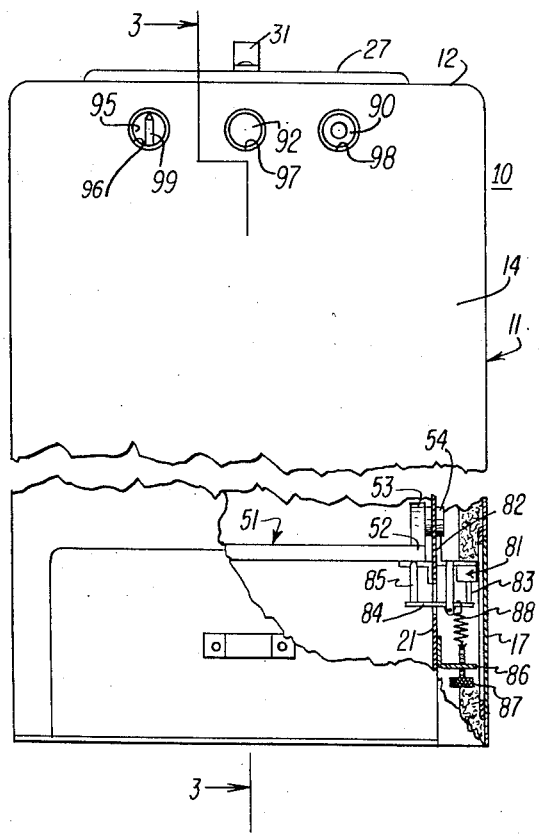
*Fig. 2*
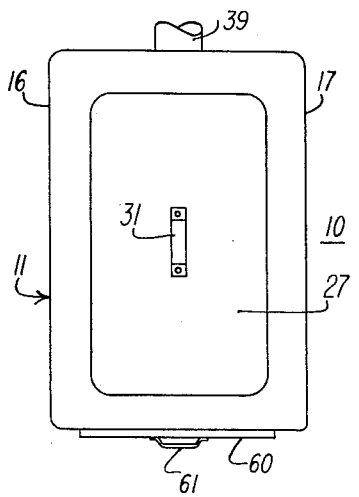
*Fig. 4*
*Fig. 5*
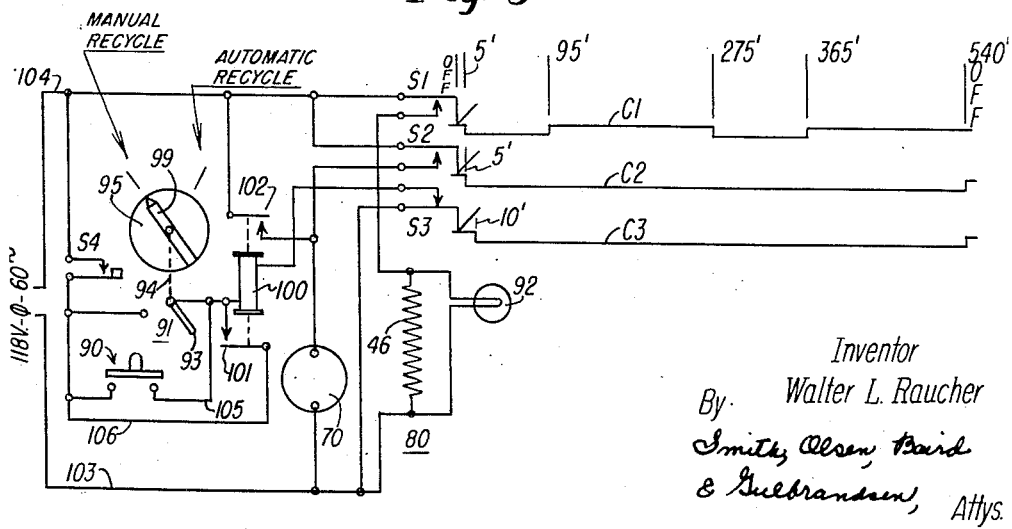
Inventor
Walter L. Raucher
By Smith, Olsen, Baird
& Gulbrandsen, Attys.

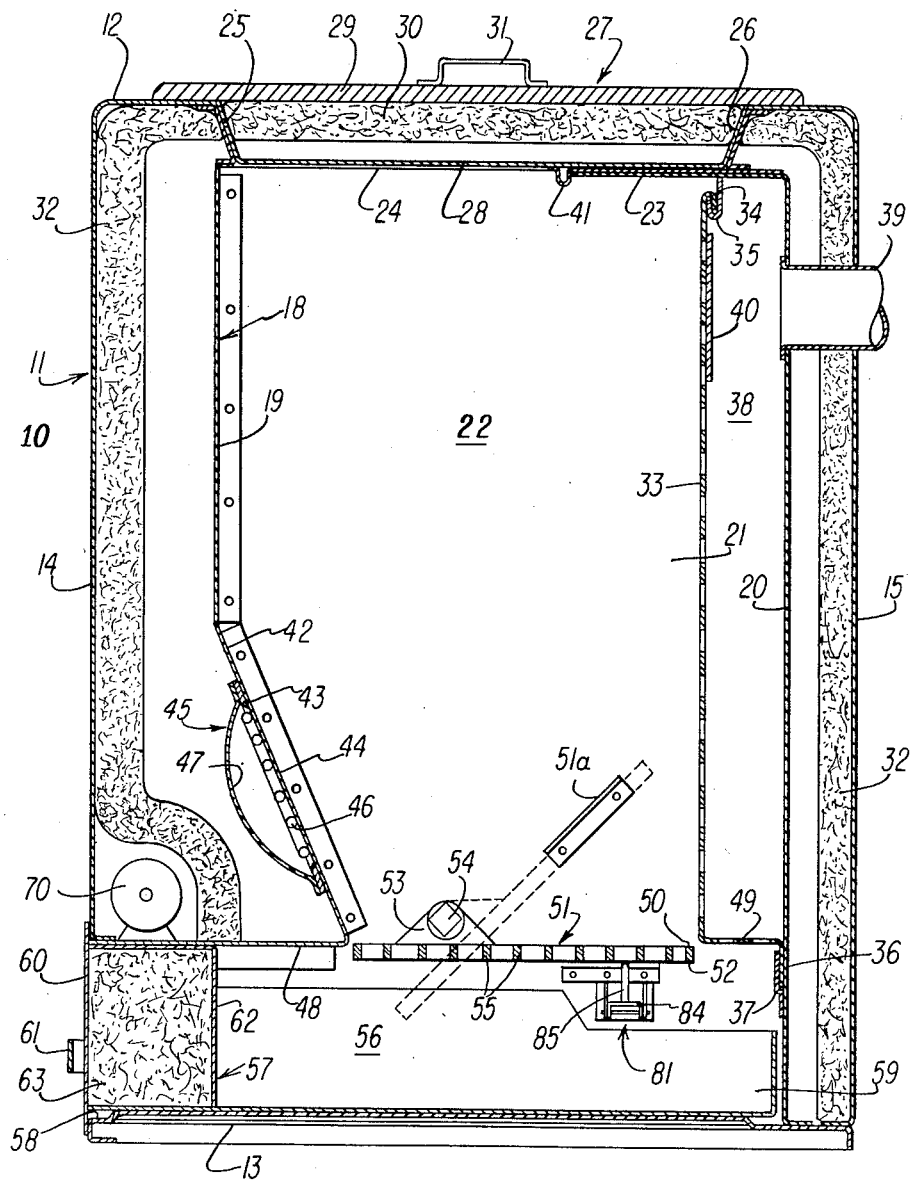

United States Patent Office 2,823,626
Patented Feb. 18, 1958

2,823,626
CONTROL CIRCUITS FOR ELECTRIC INCINERATORS

Walter L. Raucher, Chicago, Ill., assignor to General Electric Company, a corporation of New York Application March 10, 1955, Serial No. 493,337

9 Claims. (Cl. 110—18)

The present invention relates to control circuits for electric incinerators, and particularly to such control circuits for electric incinerators especially designed for use in the home.

An electric incinerator designed for use in the home is operated under a great variety of load conditions with respect to the character of the material that is to be burned or disposed of, the weight of the load, the relative inflammability of the load, etc.; whereby the time interval of the operating cycle of the incinerator required completely to burn-out or consume a load of material is subject to wide variations. For example, a load consisting essentially of paper will be completely consumed in a small fraction of a standard cycle of the incinerator, whereas a load consisting essentially of melon rinds will not be completely consumed even in several standard cycles of the incinerator. In other words, in consuming some loads, it is only necessary to ignite the normally inflammable material thereof, whereas in other loads, it is necessary to dry-out or drive-off considerable moisture before the residue of the normally non-inflammable material may be ignited.

Accordingly, it is a general object of the invention to provide in an electric incinerator especially designed for use in the home, a control circuit that is selectively settable into a number of different types of operation in order to accommodate different types of loads of material that are to be burned or consumed.

Another object of the invention is to provide a control circuit for an electric incinerator, that is selectively settable to establish either a single cycle of the incinerator, regardless of whether the load is actually burned-out or consumed, or repeated cycles of the incinerator, if required, completely to burn-out or consume the load.

A further object of the invention is to provide an electric incinerator control circuit of improved and simplified connection and arrangement that accommodates great flexibility of control of the automatic cycle thereof appropriate to a great variety of different loads.

Further features of the invention pertain to the particular arrangement of the elements of the electric incinerator control circuit, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a front elevational view, partly broken away, of an electric incinerator incorporating a control circuit embodying the present invention;

Fig. 2 is a reduced plan view of the incinerator shown in Fig. 1;

Fig. 3 is an enlarged vertical sectional view of the incinerator, taken in the direction of the arrows along the offset line 3—3 in Fig. 1;

Fig. 4 is an enlarged schematic diagram of the timer provided in the control circuit incorporated in the incinerator of Figs. 1 to 3, inclusive; and Fig. 5 is a combined electric diagram of the control circuit and a time-sequence chart of the control of the several switches incorporated therein.

Referring now to Figs. 1 to 3, inclusive, of the drawings, there is illustrated an electric incinerator 10 especially designed for use in the home, and incorporating a control circuit embodying the features of the present invention; which incinerator 10 comprises an upstanding outer metal casing or shell 11 including top and bottom walls 12 and 13, front and rear walls 14 and 15, and side walls 16 and 17. The casing 11 houses an upstanding metal firebox 18 including front and rear walls 19 and 20 and side walls 21 defining an upstanding fire-chamber 22 adapted to receive a load of material to be burned or consumed. Also the firebox 18 is provided with a top wall 23 having a top opening 24 therein that communicates with a top opening 25 provided in the top wall 12, a substantially rectangular metal throat member 26 being arranged between the top walls 12 and 23 and surrounding the top openings 24 and 25. Further, the top wall 12 carries a top door 27 normally closing the top openings 24 and 25, and capable of complete removal so as to render the fire-chamber 22 readily accessible from the exterior.

As illustrated, the door 27 comprises inner and outer metal walls 28 and 29 separated by a body of insulating material 30, such as a suitable bat of glass fiber, the door 27 also including a handle 31 carried by the outer wall 29 to facilitate ready placement and removal thereof. Also, a portion of the space disposed between the outer casing 11 and the firebox 18 is filled with a body of insulating material 32, such as a suitable bat of glass fiber. An upstanding reticulated plate 33 is arranged in the fire-chamber 22 and spaced forwardly with respect to the rear wall 20, the extreme upper end of the plate 33 terminating in a hook 34 that is detachably engageable with a cooperating hook 35 carried by the top wall 23, and the extreme lower end of the plate 33 terminating in a flange 36 that is detachably engageable with a cooperating bracket 37 carried adjacent to the lower portion of the rear wall 20. Thus the plate 33 may be readily placed and removed with respect to the fire-chamber 22 after the door 27 has been removed. Moreover, the plate 33 spaced forwardly of the rear wall 20 cooperates therewith to define a smoke chamber 38 therebetween, the upper portion of the smoke chamber 38 communicating with a flue 39 extending through the rear walls 15 and 20 and connected to a chimney, not shown. A flame shield 40 is carried by the plate 33 immediately in front of the inner end of the flue 39 so as to prevent the direct entrance of flame from the fire-chamber 22 into the smoke chamber 38 and thence into the inner end of the flue 39. Also, the top wall 23 carries a laterally extending rib 41 adjacent to the top opening 20 that assists in the support of the door 27 in its closed position.

The lower portion of the front wall 19 terminates in a rearwardly and downwardly directed wall 42 having a substantially centrally disposed and substantially circular opening 43 therein, which opening 43 receives a substantially annular hotplate 44 of an electric heating unit 45. More particularly, the electric heating unit 45 is arranged between the front wall 14 of the casing 11 and the downwardly and rearwardly sloping wall 42 and removably secured in place with the hot plate 44 serving as a stopper for the opening 43. Moreover, the electric heating unit 45 comprises an electric heating element 46 arranged in direct contact with the outer surface of the hotplate 44, as well as a heat reflector 47. Preferably, the electric heating element 46 is in the form of a flat spiral of sheathed resistance conductor, whereby the electric heating element 46 may be energized to bring about the heating of the hotplate 44 to a cherry-red temperature, the heat reflector 47 minimizing radiation of heat outwardly from the electric heating element 46 toward the front wall 14. Of course, it will be understood that when the hotplate 44 is thus heated to a cherry-red temperature, inflammable material within the fire-chamber 22 will be ignited, whereas non-inflammable material carrying moisture will be dried-out so that the residue may be ignited.

The extreme lower end of the downwardly and rearwardly sloping wall 42 terminates in a forwardly directed flange 48; and the lower end of the plate 33 terminates in a rearwardly directed flange 49; whereby an open throat 50 is defined at the bottom of the fire-chamber 22, in which there is pivotally mounted a grate 51 formed of cast iron, or other suitable material. More particularly, the grate 51 comprises boundary structure 52, the side portions of which carry two spaced-apart brackets 53 that are pivotally mounted on two cooperating trunnions 54 supported by the side walls 21 of the firebox 18. Also the boundary structure 52 carries a plurality of laterally extending and longitudinally spaced-apart grate bars 55 adapted to receive and support the load of material to be burned or consumed that is placed in the fire-chamber 22. Accordingly, the grate 51 normally closes the bottom of the fire-chamber 22 and is movable from its normal position, as illustrated in Fig. 3, into an inclined dumping position, as indicated by the dotted lines in Fig. 3. At least one of the trunnions 54 projects through the adjacent side walls 22 and 17 to the exterior so that it may receive a handle or crank facilitating movement of the grate 51 between its normal and dumping positions, and shaking of the grate 51, as required. For the purpose of limiting the movement of the grate 51 beyond its tilted dumping position, a pair of laterally spaced-apart brackets 51a are carried by the side walls 21 and serve as stops cooperating with the grate 51. Further, the grate 51 comprises a division wall between the bottom of the fire-chamber 22 and an ash chamber 56 disposed therebelow and above the bottom wall 13, which ash chamber 56 receives a removable ash drawer 57 that is supported by the bottom wall 13 and is movable through a front opening 58 provided in the front wall 14. More particularly, the ash drawer 57 is movable between a normal position disposed below the grate 51 and a completely retracted position out of the front opening 58. Further, the drawer 57 comprises ash-receiving structure 59 provided with an open top, and a front wall 60 carrying a handle 61. Also disposed behind the front wall 60 is upstanding wall structure 62 defining a void in which there is arranged heat-insulating material 63 formed of glass fiber, or the like, thereby to prevent the transmission of heat from the hot ashes in the ash-receiving structure 59 to the front wall 60.

Considering now the mode of operation of the incinerator 10, after the door 27 is removed from the top wall 12, the material to be burned or consumed is placed through the top openings 24 and 25 into the fire-chamber 22, the grate 21 being in its normal supporting position at this time, as shown in full lines in Fig. 3. The door 27 is then replaced with respect to the top wall 12 closing the top openings 24 and 25; and at this time an automatic cycle, described more fully hereinafter, is initiated, whereby the electric heating element 46 is energized, effecting heating of the hot plate 44 to its cherry-red temperature. Now in the event the material that has been placed in the fire-chamber 22 is inflammable (newspapers, paper boxes, rags, etc.), the material is quickly ignited and burned, the combustion gases passing from the fire-chamber 22 through the reticulated plate 33 into the smoke chamber 38 and thence through the flue 39. On the other hand, in the event the material that has been placed in the firebox 22 is not readily inflammable (melon rind, potato peelings, fruit parings, meat bones and scraps, etc.), the material is heated and the moisture therein is driven therefrom, whereby ultimately a residue is produced that is at least partially inflammable, whereby the moisture and combustion gases again pass ultimately through the flue 39. Of course, in this case, considerably more time is consumed in the complete consummation of the material placed in the fire-chamber 22, since it is not initially inflammable. The ash produced as a consequence of burning or consummation of the material comprising the load in the fire-chamber 22 normally falls through the grate bars 55 into the ash drawer 57 so that they may be ultimately removed and emptied therefrom, after removal of the ash drawer 57 from the ash compartment 56 through the front wall 14.

In the event some of the material comprising the load placed in the fire-chamber 22 is ultimately noninflammable, clinkers are formed that normally fall through the grate bars 55 into the ash drawer 57; however, some of the clinkers may accumulate upon the grate 51 rendering it necessary to shake the grate 51, or at least move it from its normal position into its tilted dumping position, employing the handle or crank, not shown, that cooperates with one of the trunnions 54 that projects through the side walls 21 and 17, the stops 51a limiting the movement of the grate 51 beyond its tilted dumping position, as indicated by the dotted lines in Fig. 3. In this connection, it is noted that the brackets 53 that are carried by the boundary structure 52 of the grate 51 and mounted upon the trunnions 54 are disposed forwardly with respect to the center of the grate 51, whereby the grate 51 is normally biased by gravity into its normal position, as illustrated in full lines in Fig. 3.

As previously noted, the incinerator 10 comprises an automatic control circuit that includes a timer motor 70 that is disposed in the lower front portion of the space between the front walls 14 and 19, as illustrated in Fig. 3. The timer motor 70, as illustrated in Fig. 4, comprises an operating shaft 71 that is connected by speed reduction mechanism 72 (a gear train) to an operating shaft 73 carrying three insulating control cams C1, C2 and C3, respectively cooperating with three sets of switch springs S1, S2 and S3. Preferably, the timer motor 70 is of the synchronous type, operative by a commercial source of power of 118-volts single-phase, 60 cycles; and the gear train 72 is so constructed and arranged that the operating shaft 73 is rotated through one complete revolution in nine hours of running time of the timer motor 70.

Further, the incinerator 10 comprises an automatic control circuit (generally designated at 80 in Fig. 5), including the source of power mentioned, the timer motor 70 and the control cams C1 to C3, inclusive, together with the associated sets of switch springs S1 to S3, inclusive, and the electric heating element 46. Further, the electric control circuit 80 comprises a grate switch 81 (best shown in Figs. 1 and 3). More particularly, the grate switch 81 is arranged in the lower portion of the space disposed between the side walls 17 and 21 and mounted upon a bracket 82 carried by the side wall 21. The grate switch 81 is provided with a downwardly projecting operating plunger 83 that cooperates with a pair of switch springs S4 (indicated in Fig. 5). More particularly, the grate switch 81 may be of the so-called "micro-switch type"; and the outer end of the plunger 83 cooperates with the outer end of a lever 84 that is also pivotally mounted upon the bracket 82, the inner end of the lever 84 carrying a plunger 85 that cooperates with the adjacent boundary structure 52 of the grate 51. Disposed below the grate switch 81 is a bracket 86 that carries a downwardly extending threaded adjusting screw 87, the upper end of the adjusting screw 87 being connected by a coil spring 88 to the outer end of the lever 84; which arrangement is provided for the purpose of applying an initial bias to the lever 84 so as to act against the bias applied by the weight of the grate 51 upon the lever 84. In the arrangement, the switch springs of the set S4 incorporated in the grate switch 81 are normally biased into their open position (as indicated in Fig. 5); and this bias may be varied by selectively adjusting the screw 87. In other words, the normal weight of the grate 51 as applied to the plunger 85 and as counterbalanced by the coil spring 88 does not move the set of switch springs S4 into its closed position; however, when a load of material to be burned is placed into the fire-chamber 22 and supported upon the grate 51, the additional weight acting upon the plunger 85 causes the lever 84 to be operated to actuate the plunger 83 so that the grate switch 81 is operated into its closed position effecting closure of the set of switch springs S4. Subsequently, when the load of material supported by the grate 51 has been burned-out as a consequence of operating of the heating unit 45, the total weight of the grate 51 and any small amount of ashes carried thereby is not sufficiently great to retain the grate switch 81 in its closed position, whereby the grate switch 81 is returned back into its normal open position as a consequence of the bias applied by the coil spring 88.

Continuing now with the control circuit, as shown in Fig. 5, it further comprises a manually operable pushbutton start switch 90 and a manually operable cycle preselect switch 91, as well as a pilot lamp 92. The cycle preselect switch 91 comprises a switch blade 93 carried by a rotatably mounted operating shaft 94, also carrying a manual dial 95. The manual dial 95 may be arranged in a cooperating recess 96 provided in the upper left-hand portion of the front wall 14 of the casing 11; the pilot lamp 92 may be arranged in a corresponding recess 97 provided in the upper central portion of the front wall 14 of the casing 11; and the pushbutton switch 90 may be arranged in a corresponding recess 98 provided in the upper right-hand portion of the front wall 14 of the casing 11. As best illustrated in Fig. 5, the manual dial 95 of the cycle preselect switch 91 is provided with a combined operating handle and index marker 99 that cooperates with associated indicia carried by the front wall 14 of the casing 11, one of the indices mentioned comprising the words: "manual recycle" and another of the indices mentioned comprising the words: "automatic recycle." The cycle preselect switch 91 is of the two-position type, whereby it occupies either its manual recycle position or its automatic recycle position.

Further, the control circuit 80 comprises a relay 100 provided with an operating winding and two pairs of contacts 101 and 102; and the source of current supply mentioned includes a pair of line conductors 103 and 104.

In the arrangement, the conductor 103 is connected to one terminal of the timer motor 70, to one of the springs of the set S3, and to one of the terminals of the electric heating element 46; while the conductor 104 is connected to one of the springs of the set S4, to one of the contacts of the set 102, to one of the springs of the set S1, and to one of the springs of the set S2. The other spring of the set S1 is connected to the other terminal of the electric heating element 46; the other spring of the set S2 is connected to the other contact of the set 102 and to the other terminal of the timer motor 70; and the other spring of the set S3 is connected to one terminal of the winding of the relay 100, the other terminal of the winding of the relay 100 being connected to a conductor 105. The conductor 105 is also connected to the blade 93 of the cycle preselect switch 91, to one of the contacts of the set 101 and to one of the contacts of the pushbutton switch 90. The other spring of the set S4 is connected to a conductor 106, that, in turn, is connected to the contact of the cycle preselect switch 91, to the other contact of the pushbutton switch 90 and to the other contact of the set 101.

Also in the arrangement, the set of switch springs S4 normally occupies its open position, as previously noted, when the grate 51 is not loaded; the relay 100 normally occupies its restored position opening the sets of contacts 101 and 102; and the pushbutton switch 90 normally occupies its open position. Further, the pilot lamp 92 is bridged across the terminals of the electric heating element 46; and the timer motor 70 is normally in its rest position causing the control cams C1, C2 and C3 to occupy their off positions, whereby the sets of switch springs S1 and S2 are operated into their open positions, and the set of switch springs S3 is operated into its closed position. Accordingly, the electric heating element 46 is normally deenergized; and the pilot lamp 92 is normally extinguished.

Now assuming that a load of material is to be burned or consumed in the incinerator 10, and that the material of the load is estimated to be inflammable, or at least does not carry considerable moisture, whereby the manual dial 95 is operated by the handle 99 setting the cycle preselect switch 91 into its manual recycle position, as illustrated in Fig. 5. At this time, the cover 27 is removed and the material mentioned is placed within the fire-chamber 22 in supported position upon the grate 51 so that the grate switch 81 is operated into its closed position. After replacement of the cover 27, the start pushbutton 90 is momentarily operated so as to complete a circuit for energizing the winding of the relay 100, this circuit including the line conductor 103, the closed set of switch springs S3, the winding of the relay 100, the conductor 105, the closed pushbutton switch 90, the conductor 106, the closed set of switch springs S4, and the line conductor 104. When the winding of the relay 100 is thus energized, it operates to close its contacts 101 and 102. Closure of the contacts 101 completes a multiple path, including the conductor 106, in bypassing relation to the closed pushbutton switch 90 for energizing the winding of the relay 100, thereby to retain the relay 100 in its operated position after the start pushbutton 90 is returned back into its open position. Accordingly, it is necessary only momentarily to operate the start pushbutton 90 in order to effect operation of the relay 100, whereby the latter relay in its operated position completes, at its contacts 101, a holding circuit for energizing the winding thereof. Closure of the contacts 102 completes an obvious circuit for operating the timer motor 70, whereby the control cams C1, C2 and C3 are rotated by the operating shaft 73 at the timed rate of one complete revolution in nine hours.

For purpose of description, it may be assumed that the control cams C1, C2 and C3 are moved toward the left with respect to the associated sets of switch springs S1, S2 and S3, as shown in Fig. 5; whereby after the expiration of five minutes, the control cam C1 operates the set of switch springs S1 into its closed position and the control cam C2 operates the set of switch springs S2 into its closed position. Closure of the set of switch springs S1 completes an obvious circuit for energizing the electric heating element 46 and for illuminating the pilot lamp 92, whereas closure of the set of switch springs S2 completes an independent multiple circuit for operating the timer motor 70. The illuminated pilot lamp 92 indicates that the electric heating element 46 is being energized; whereby the hotplate 44 is heated, quickly reaching its cherry-red temperature so as to ignite the load of material arranged in the fire-chamber 22 and supported by the grate 51.

After the expiration of ten minutes, the control cam C3 operates the set of switch springs S3 into its open position, thereby effecting the deenergization of the winding of the relay 100, so that the latter relay restores opening its contacts 101 and 102. Opening of the contacts 101 interrupts a further point in the holding circuit for energizing the winding of the relay 100, whereas opening of the contacts 102 interrupts the original circuit for operating the timer motor 70. However, operation of the timer motor 70 continues at this time, notwithstanding the restoration of the relay 100, by virtue of the closed position of the set of switch springs S2; and also energization of the electric heating element 46 is continued by virtue of the closed position of the set of switch springs S1.

As time proceeds, the load of material in the fire-chamber 22 and supported upon the grate 51 is consumed and the resulting ashes fall through the grate bars 55 into the ash drawer 57, whereby the total load upon the grate 51 is greatly reduced so that the grate switch 81 is operated back into its open position; however, without effect at this time, since the relay 100 already occupies its restored position.

At the expiration of ninety-five minutes, the control cam C1 operates the set of switch springs S1 into its open position effecting deenergization of the electric heating element 46 and extinguishing of the pilot lamp 92; however, the timer motor 70 continues to run and after the expiration of two-hundred and seventy-five minutes, the control cam C1 reoperates the set of switch springs S1 back into its closed position. Again the electric heating element 46 is energized, and again the pilot lamp 92 is illuminated indicating this circumstance. More particularly, the electric heating element 46 is re-energized during a time interval of ninety minutes, whereby at the expiration of three-hundred and sixty-five minutes, the control cam C1 reoperates the set of switch springs S1 back into its open position in order again to deenergize the electric heating element 46 and again to extinguish the pilot lamp 92.

Operation of the timer motor 70 continues and at the expiration of a total time interval of five-hundred and forty minutes (nine hours) the cycle is completed, whereby the control cams C2 and C3 operate the sets of switch springs S2 and S3 respectively back into their open and closed positions. Opening of the sets of switch springs S2 arrests operation of the timer motor 70; whereas closure of the set of switch springs S3 reprepares the pick-up circuit for energizing the winding of the relay 100. At this time, the cycle is completed and further operation of the timer motor 70 is arrested, and further energization of the electric heating element 46 is arrested.

In passing, it is noted that the load of material arranged in the fire-chamber 22 and supported by the grate 51 is normally burned-out within the nine-hour automatic cycle of the control circuit, so that the grate switch 81 is re-operated sometime during this time interval back into its open position. However, the load of material mentioned may not be burned-out in the event it contains considerable moisture or is otherwise non-inflammable, whereby a considerable load may remain upon the grate 51 so that the grate switch 81 is retained in its closed position. However, recycling of the control circuit is not re-initiated automatically, even though the grate switch 81 occupies its closed position effecting closure of the set of switch springs S4, since both the pick-up circuit and the holding circuit for energizing the winding of the relay 100 are open at this time, when the cycle preselect switch 91 occupies its manual recycled position, as previously assumed. Thus in this event, it is necessary for the operator again momentarily to operate the pushbutton 90 in order to initiate another cycle of operation of the control circuit.

Now assuming that when the load of material to be burned or consumed was placed in the fire-chamber 22 and supported upon the grate 51, the operator contemplated that it contained considerable moisture or that it would not otherwise be burned-out within the normal or standard nine-hour cycle of the control circuit. In this event, the operator might have operated the cycle preselect switch 91 into its automatic recycle position by appropriate manipulation of the handle 99. In this case, the switch blade 93 engages the associated contact completing a direct circuit for energizing the winding of the relay 100 so as to effect operation thereof independently of the operation of the pushbutton 90. Upon operating the relay 100 completes at its contacts 101 the holding circuit for energizing the winding thereof, and completes, at its contacts 102, the circuit for operating the timer motor 70, whereby the cycle of the control circuit is initiated, in the manner previously explained. However, in this case, it is noted that after the complete cycle of the control circuit when the control cams C1, C2 and C3 return the sets of switch springs S1, S2 and S3 back into their normal or off positions, the circuit for energizing the winding of the relay 100 is recompleted, in the event the grate switch 81 still occupies its closed position retaining closed the set of switch springs S4. Thus assuming that the load is not completely burned-out at the conclusion of the automatic cycle of the control circuit, the grate switch 81 remains in its closed position, whereby another automatic cycle of the control circuit is initiated when the control cams C1, C2 and C3 are returned back into their normal or off positions. This recycling of the control circuit, when the cycle preselect switch 91 occupies its automatic recycle position, as assumed above, continues until the required number of automatic cycles of the control circuit have been effected to accomplish the complete burning-out or consummation of the load of material in the fire-chamber 22 and supported upon the grate 51. When the load of material mentioned is ultimately burned-out or consumed, the reduction in the weight upon the grate 51 effects the return of the grate switch 81 into its open position so that at the conclusion of the operating cycle, when the control cams C1, C2 and C3 are returned back into their normal or off positions, further recycling of the control circuit is arrested by virtue of the circumstance that the grate switch 81 occupies its open position effecting opening of the set of switch springs S4.

In passing, it is noted that the arrangement comprising the 5-minute initial portion of each of the control cams C1 and C2 and the 10-minute initial portion of the control cam C3 prevents the effective initiation of a cycle of the control circuit, when the cycle preselect switch 91 occupies its automatic recycle position, and the operator finds it desirable to shake the grate 51 employing the handle or crank, not shown, that cooperates with one of the trunnions 54. In this event, it will be appreciated that the shaking of the grate 51 effects alternate closing and opening of the set of switch springs S4 of the grate switch 81, whereby the above-described circuit for energizing the winding of the relay 100 is repeatedly completed and interrupted so that the relay 100 follows operating and restoring repeatedly. Each time the relay 100 operates and then restores, it completes and then interrupts, at the contacts 102, the previously traced circuit for operating the timer motor 70; whereby, during the shaking of the grate 51, there is some running of the timer motor 70 during exceedingly short time intervals. However, the total of the time intervals mentioned does not exceed a minute or so, whereby the control cams C1 and C2 retain the sets of switch springs S1 and S2 in their open positions and the control cam C3 retains the set of switch springs S3 in its closed position. Accordingly, when the operator finishes this shaking of the grate 51, the grate switch 81 is restored into its open position effecting opening of the set of switch springs S4 and the consequent restoration of the relay 100 so that further operation of the timer motor 70 is arrested. As noted above, the sets of switch springs S1, S2 and S3 occupy their off or start positions at this time so that the cycle of the control circuit is not initiated by the shaking of the grate 51 and the consequent momentary operations of the grate switch 81 into its closed position. Thus the arrangement described prevents a useless cycle of the control circuit in the event of the combination of the conditions described.

In view of the foregoing, it will be understood that incident to loading the incinerator 10, the operator should estimate the character of the load of material placed in the fire-chamber 22 and supported upon the grate 51 with regard to whether more than one automatic cycle of the control circuit may be required to effect complete burning-out or consummation of the material mentioned. In the event the operator estimates that the load of material may be readily burned-out or consumed, she actuates the cycle preselect switch 91 into its manual recycle position and momentarily operates the start pushbutton 90; whereby only one automatic cycle of the control circuit ensues, in the manner explained above. On the other hand, in the event the operator estimates that the load of material may not be readily burned-out or consumed, she actuates the cycle preselect switch 91 into its automatic recycle position (operation of the pushbutton start switch 90 being unnecessary in this case); whereby a plurality of automatic cycles of the control circuit ensue, if required, and under the sole control of the grate switch 81.

In view of the foregoing, it is apparent that there has been provided in an electric incinerator designed for use in the home, an improved control circuit that is exceedingly flexible and presettable into different types of operations as may be required by a wide variety of loads of material to be burned-out or consumed in the incinerator.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer operative through a predetermined cycle, a start circuit including said grate switch in its closed position for initiating operation of said timer, a run circuit responsive to initiation of operation of said timer for effecting continued operation thereof through its predetermined cycle independently of said start circuit, and switching means selectively controlled by operation of said timer through its predetermined cycle for selectively connecting and disconnecting said heating unit with respect to said power source.

2. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer operative through a predetermined cycle, a start circuit including said grate switch in its closed position for initiating operation of said timer, a run circuit responsive to initiation of operation of said timer for effecting continued operation thereof through its predetermined cycle independently of said start circuit, and switching means selectively controlled by operation of said timer through its predetermined cycle for connecting and then for disconnecting said heating unit a plurality of times with respect to said power source.

3. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer operative through a predetermined cycle, a manually operable start switch, a start circuit responsive jointly to operation of said grate switch into its closed position and to momentary closure of said start switch for initiating operation of said timer, a run circuit responsive to initiation of operation of said timer for effecting continued operation thereof through its predetermined cycle independently of said start circuit, and switching means selectively controlled by operation of said timer through its predetermined cycle for selectively connecting and disconnecting said heating unit with respect to said power source.

4. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer having an off position and a plurality of control positions and operative from its off position through its control positions and back into its off position, first and second circuits for operating said timer, a manually operable start switch, means responsive jointly to operation of said grate switch into its closed position and to momentary closure of said start switch for completing said first circuit when it is prepared, means responsive to operation of said timer out of its off position for interrupting said first circuit and for completing said second circuit and responsive to operation of said timer back into its off position for interrupting said second circuit and for repreparing said first circuit, and switching means selectively controlled by operation of said timer through its control positions for selectively connecting and disconnecting said heating unit with respect to said power source.

5. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer having an off position and a plurality of control positions and operative from its off position through its control positions and back into its off position, first and second circuits for operating said timer, a relay, a third circuit for operating said relay, a fourth circuit for holding operated said relay, a manually operable start switch, control means responsive jointly to operation of said grate switch into its closed position and to momentary closure of said start switch for completing said third circuit to effect operation of said relay, means responsive to operation of said relay for completing said fourth circuit, said relay in its operated position completing said first circuit and in its restored position interrupting said first circuit, means responsive to operation of said timer out of its off position for completing said second circuit and responsive to operation of said timer back into its off position for interrupting said second circuit, additional means responsive to operation of said timer out of its off position for opening a common point in said third and fourth circuits to effect restoration of said relay and responsive to operation of said timer back into its off position for reclosing said common point in said third and fourth circuits, and switching means selectively controlled by operation of said timer through its control positions for selectively connecting and disconnecting said heating unit with respect to said power source.

6. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer operative through a predetermined cycle, a start circuit responsive to operation of said grate switch into its closed position for initiating operation of said timer, a run circuit responsive to initiation of operation of said timer for effecting continued operation thereof through its predetermined cycle independently of said start circuit, whereby said start circuit initiates another cycle of operation of said timer at the conclusion of one cycle of operation thereof in the event said grate switch still occupies its closed position, and switching means selectively controlled by operation of said timer through its predetermined cycle for selectively connecting and disconnecting said heating unit with respect to said power source.

7. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer having an off position and a plurality of control positions and operative from its off position through its control positions and back into its off position, first and second circuits for operating said timer, control means responsive to operation of said grate switch into its closed position for completing said first circuit when it is prepared, means responsive to operation of said timer out of its off position for interrupting said first circuit and for completing said second circuit and responsive to operation of said timer back into its off position for interrupting said second circuit and for repreparing said first circuit, whereby said control means recompletes said first circuit when said timer is operated back into its off position in the event said grate switch still occupies its closed position, and switching means selectively controlled by operation of said timer through its control positions for selectively connecting and disconnecting said heating unit with respect to said power source.

8. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer having an off position and a plurality of control positions and operative from its off position through its control positions and back into its off position, first and second circuits for operating said timer, a relay, a third circuit for operating said relay, a fourth circuit for holding operated said relay, control means responsive to operation of said grate switch into its closed position for completing said third circuit to effect operation of said relay, means responsive to operation of said relay for completing said fourth circuit, said relay in its operated position completing said first circuit and in its restored position interrupting said first circuit, means responsive to operation of said timer out of its off position for completing said second circuit and responsive to operation of said timer back into its off position for interrupting said second circuit, additional means responsive to operation of said timer out of its off position for opening a common point in said third and fourth circuits to effect restoration of said relay and responsive to operation of said timer back into its off position for reclosing said common point in said third and fourth circuits, whereby said control means recompletes said third circuit when said timer is operated back into its off position in the event said grate switch still occupies its closed position, and switching means selectively controlled by operation of said timer through its control positions for selectively connecting and disconnecting said heating unit with respect to said power source.

9. In an incinerator including a firebox provided with a grate adapted to support material to be burned and movable between unloaded and loaded positions, said grate normally occupying its unloaded position and being moved into its loaded position in response to the placement thereon of the material to be burned and being moved back into its unloaded position in response to the burning-out of the material supported thereby, and an electric heating unit associated with said firebox and effective when heated to ignite the material supported by said grate; the combination comprising a source of electric power, a grate switch operatively associated with said grate and selectively operated into open and closed positions in response to movements of said grate into its respective unloaded and loaded positions, an electric timer having an off position and a plurality of control positions and operative from its off position through its control positions and back into its off position, first and second circuits for operating said timer, a relay, a third circuit for operating said relay, a fourth circuit for holding operated said relay, a manually operable start switch having open and closed positions, said start switch remaining in its closed position only so long as it is manually held therein, a manually operable recycle switch having open and closed positions, said recycle switch remaining in either one of its positions into which it is manually operated, said start switch and said recycle switch being arranged in parallel relation with each other and in series relation with said grate switch and in said third circuit, whereby said third circuit is completed in response to operation of said grate switch into its closed position together with closure of either of said start switch or said recycle switch so as to effect operation of said relay, means responsive to operation of said relay for completing said fourth circuit, said relay in its operated position completing said first circuit and in its restored position interrupting said first circuit, means responsive to operation of said timer out of its off position for completing said second circuit and responsive to operation of said timer back into its off position for interrupting said second circuit, additional means responsive to operation of said timer out of its off position for opening a common point in said third and fourth circuits to effect restoration of said relay and responsive to operation of said timer back into its off position for reclosing said common point in said third and fourth circuits, whereby said third circuit is recompleted when said timer is operated back into its off position in the joint events that said grate switch still occupies its closed position and said recycle switch occupies its closed position, and switching means selectively controlled by operation of said timer through its control positions for selectively connecting and disconnecting said heating unit with respect to said power source.

References Cited in the file of this patent

UNITED STATES PATENTS

| | | |
|---|---|---|
| 1,293,141 | McGary | Feb. 4, 1919 |
| 2,376,938 | Patter | May 29, 1945 |
| 2,653,213 | Comstock | Sept. 22, 1953 |
| 2,675,456 | Cleminson | Apr. 13, 1954 |
| 2,716,386 | Smart | Aug. 30, 1955 |
| 2,763,760 | Buckle | Sept. 18, 1956 |
| 2,768,386 | Graef et al. | Oct. 30, 1956 |